US011990719B2

(12) United States Patent
Chen et al.

(10) Patent No.: US 11,990,719 B2
(45) Date of Patent: May 21, 2024

(54) ELECTRICAL MALE TERMINAL

(71) Applicant: J.S.T. CORPORATION, Farmington Hills, MI (US)

(72) Inventors: Ping Chen, Novi, MI (US); Gwendolyn Upson, Ypsilanti, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 0 days.

(21) Appl. No.: 18/112,940

(22) Filed: Feb. 22, 2023

(65) Prior Publication Data

US 2023/0198173 A1 Jun. 22, 2023

Related U.S. Application Data

(60) Division of application No. 17/353,276, filed on Jun. 21, 2021, now Pat. No. 11,626,671, which is a continuation-in-part of application No. 16/828,291, filed on Mar. 24, 2020, now Pat. No. 11,043,766.

(60) Provisional application No. 62/893,679, filed on Aug. 29, 2019.

(51) Int. Cl.
*H01R 4/18* (2006.01)
*H01R 13/04* (2006.01)

(52) U.S. Cl.
CPC ............. *H01R 4/185* (2013.01); *H01R 13/04* (2013.01)

(58) Field of Classification Search
CPC ....... H01R 13/432; H01R 13/04; H01R 4/185
USPC ........................................................... 439/746
See application file for complete search history.

(56) References Cited

U.S. PATENT DOCUMENTS

| | | | |
|---|---|---|---|
| 4,046,450 | A | 9/1977 | Yurtin |
| 5,266,056 | A | 11/1993 | Baderschneider |
| 6,217,379 | B1 | 4/2001 | D'Hulster |
| 6,238,252 | B1 | 5/2001 | Flieger |

(Continued)

OTHER PUBLICATIONS

International Search Report for International Application No. PCT/US2020/048364 issued Nov. 20, 2020 (3 sheets).

(Continued)

*Primary Examiner* — Gary F Paumen
(74) *Attorney, Agent, or Firm* — Kratz, Quintos & Hanson, LLP

(57) ABSTRACT

An electrical male terminal of this invention includes a clamp or crimp area, a main body, and a blade. Protruding members and support members of the main body act as overstress protection. A panel shield member protects a protruding guide member. In another embodiment of this invention, a protruding member extends from a first support member of the main body, and a cut-out portion at the lower portion of the main body accommodates therein the protruding member to prevent the tang member from inadvertently or accidentally rotating relative to the lower portion of the main body. Furthermore, in this another embodiment of the electrical male terminal of this invention, a protrusion extends from the unattached end portion of the lever member for allowing the lever member to deflect upward when the protruding member of the unattached end portion interacts with an internal protrusion of a housing or connector assembly, thereby making it more difficult to remove the electrical male terminal from the housing or connector assembly, thereby protecting the electrical male terminal from inadvertently falling out during use.

4 Claims, 15 Drawing Sheets

(56) References Cited

U.S. PATENT DOCUMENTS

| | | | |
|---|---|---|---|
| 6,390,860 B2 | 5/2002 | Shirouzu | |
| 6,572,417 B2 | 6/2003 | Katsuma | |
| 6,755,696 B1 | 6/2004 | Ko | |
| 6,997,761 B2 | 2/2006 | Lutsch | |
| 7,217,161 B1 | 5/2007 | Tyler | |
| 7,635,286 B1 | 12/2009 | Morello | |
| 7,950,972 B1 | 5/2011 | Chen | |
| 9,022,818 B2 | 5/2015 | Onuma | |
| 9,698,496 B2 | 7/2017 | Yudate | |
| 9,799,976 B2 | 10/2017 | Lehner | |
| 9,831,591 B2 * | 11/2017 | Hu | H01R 13/432 |
| 10,522,934 B2 | 12/2019 | Zhang | |
| 11,043,766 B2 | 6/2021 | Chen | |
| 2005/0118884 A1 | 6/2005 | Lutsch | |
| 2015/0140876 A1 | 5/2015 | Lehner et al. | |
| 2016/0240936 A1 | 8/2016 | Yudate | |
| 2017/0062964 A1 | 3/2017 | Yang | |
| 2017/0133783 A1 | 5/2017 | Hu | |
| 2017/0155205 A1 | 6/2017 | Zhang et al. | |
| 2017/0271803 A1 | 9/2017 | Hu | |
| 2018/0151997 A1 | 5/2018 | Busies et al. | |
| 2020/0176917 A1 | 6/2020 | Zhou | |

OTHER PUBLICATIONS

Written Opinion of the International Searching Authority for International Application No. PCT/US2020/048364 issued Nov. 20, 2020 (8 sheets).

International Search Report for International Application No. PCT/US2021/038291dated Sep. 27, 2021(3 sheets).

Written Opinion of the International Preliminary Examining Authority for International Application No. PCT/US2021/038291 issued Mar. 11, 2022 (4 sheets).

* cited by examiner

ELECTRICAL MALE TERMINAL

CROSS-REFERENCE TO RELATED APPLICATIONS

This is a Divisional Application of U.S. patent application Ser. No. 17/353,276 on Jun. 21, 2021, which is a Continuation-In-Part of U.S. patent application Ser. No. 16/828,291 filed on Mar. 24, 2020, which claims priority to U.S. Provisional Patent Application No. 62/893,679 filed Aug. 29, 2019, all of which are incorporated herein by reference in their entireties.

BACKGROUND OF THE INVENTION

It is desired that an electrical male terminal be provided with structural arrangements or features for overstress protection and guide-assist to efficiently protect and guide the electrical male terminal, and thereby prevent undesired deformation of the electrical male terminal during mating thereof with a connector assembly.

It is further desired to ensure that orientations or polarities of the electrical male terminal of this invention and a corresponding connector assembly be maintained for proper fitting therewith.

It is further desired that in another embodiment of the electrical male terminal of this invention, the tang member is prevented from inadvertently or accidentally rotating relative to the lower portion of the main body, and thereby further prevents the electrical male terminal from unraveling. This is achieved by having a protruding member extend from a first support member of a main body, and a cut-out portion at a lower portion of the main body for accommodating therein the protruding member.

It is further desired that in the another embodiment of the electrical male terminal of this invention, a protrusion extends from an unattached end portion of a lever member, the protrusion having faces angled relative to each other for promoting the lever member to deflect upward when interacting with an internal protrusion of a housing or a connector assembly, which makes it more difficult to remove the electrical male terminal from the housing or the connector assembly, thereby protecting the electrical male invention of this invention from inadvertently falling out during use.

SUMMARY OF THE INVENTION

The electrical male terminal of this invention is substantially box-shaped, and generally includes a tang member. The tang member includes a lever member which locks the electrical male terminal with the connector assembly. The lever member has a protruding member, which meets another protruding member extending from the main body, when the lever member is flexed. Both protruding members act as an overstress protection for the lever member; i.e., to prevent or protect the lever member front becoming deformed when the male terminal is being mated with the connector assembly.

A protruding guide member protrudes from and is attached to the tang member. A front end portion of the main body also includes a tapered portion. The front end portion of the main body further includes a panel shield member for protecting the protruding guide member. The tapered portion, along with a protruding guide member and panel guide member, of the main body, assist in guiding the male terminal of this invention when mated with the connector assembly. The front end portion of the main body transitions into a blade having a tip thereof that is also tapered. The main body further includes support members at either end thereof.

The electrical male terminal of this invention also has an orientation or polarity for proper fitment into the corresponding connector assembly, having an orientation or polarity which is also maintained for proper fitting with the electrical male terminal.

In another embodiment of the electrical male terminal of this invention, the tang member is prevented from inadvertently or accidentally rotating relative to the lower portion of the main body, and thereby further prevents the electrical male terminal from unraveling. This is achieved by having a yet another protruding member extend from the first support member of the main body, and a cut-out portion at the lower portion of the main body for accommodating therein the yet another protruding member.

Furthermore, in this another embodiment of the electrical male terminal of this invention, a protrusion extends from the unattached end portion of the lever member, the protrusion having faces angled relative to each other for promoting the lever member to deflect upward when interacting with an internal protrusion of a housing or a connector assembly. Consequently, the protrusion extending from the unattached end portion of the lever member makes it more difficult for the electrical male terminal of this invention to be removed from the housing or connector assembly, and protects the electrical male terminal of this invention from inadvertent falling out during use.

BRIEF DESCRIPTION OF THE DRAWINGS

FIG. 4C shows a cross-sectional view of a floor of the wire-clamping tabs or core crimp wing portions as substantially flat in shape, while

DETAILED DESCRIPTION OF THE PREFERRED EMBODIMENTS

Figure 1A:
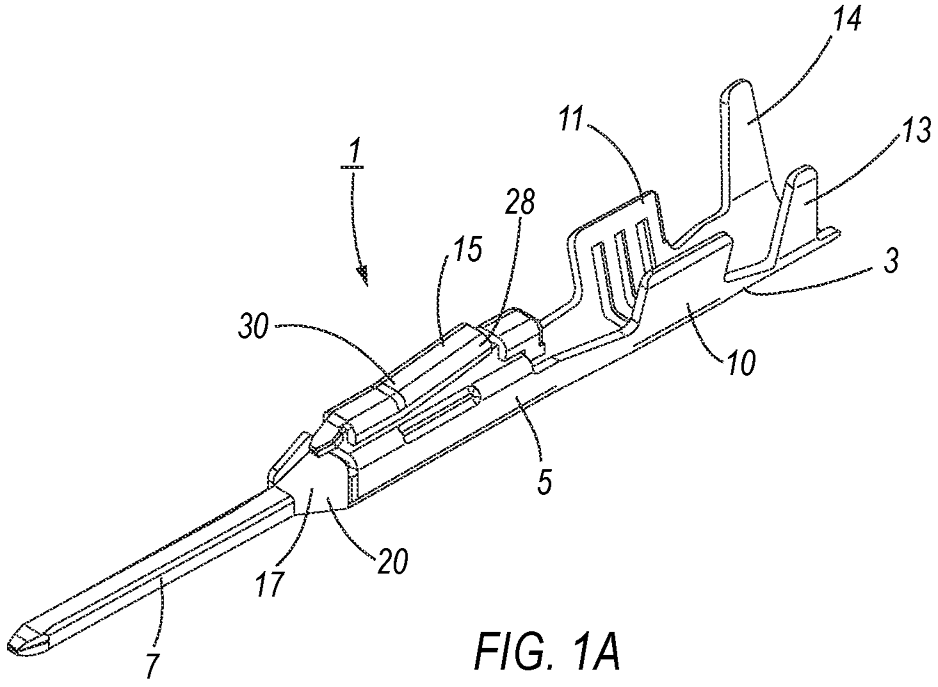
FIG. 1A is a front top perspective view of the electrical male terminal of this invention.
Figure 1B:
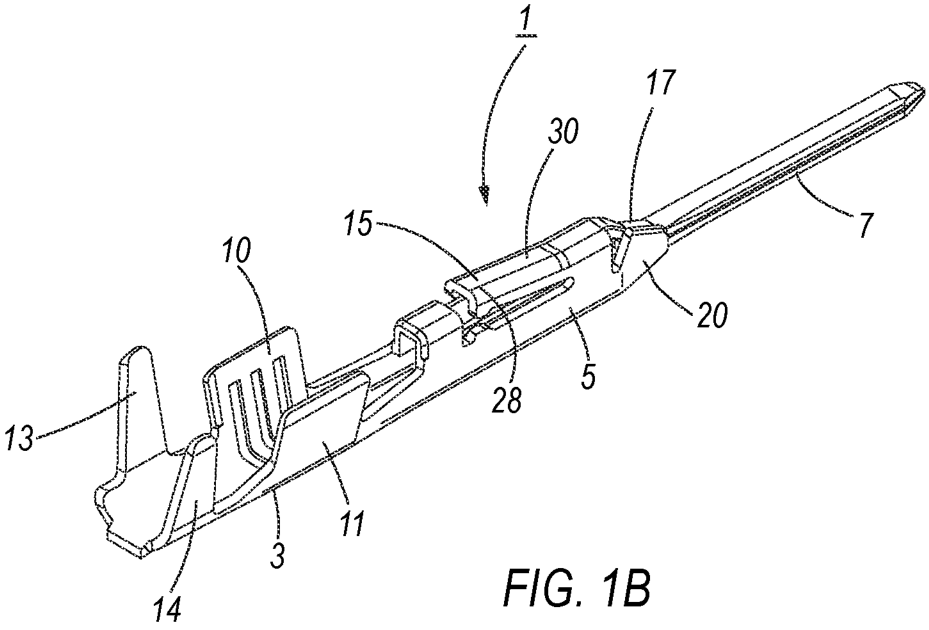
FIG. 1B is a back top perspective view of the electrical male terminal of this invention.

FIG. 1 shows a front top perspective view of the electrical male terminal, general referred to as reference number 1. The electrical male terminal 1 includes a clamp or crimp area 3, a main body 5, and a blade 7 integrally formed in a lengthwise direction. As more fully discussed later, the clamp or crimp area 3 includes a pair of wire-clamping tabs or core crimp wing portions 10, 11, and a pair of wire-insulation clamping tabs or insulation crimp wing portions 13, 14, The main body 5 includes a tang member 15 as well as a tapered portion 17 at a front end portion 20 thereof. The tapered portion 17 narrowly tapers towards the blade 7. Similarly shown in the back top perspective view of the male terminal 1 in FIG. 1B, is the clamp or crimp area 3, including the pair of wire-clamping tabs or core crimp wing portions 10, 11 and the pair of wire-insulation clamping tabs or insulation crimp wing portions 13, 14. Also similarly shown in FIG. 1B in the back top perspective view of the electrical male terminal 1, as in FIG. 1A, are the tang member 15 and the tapered portion 17 at the front end portion 20 of the main body 5. It is preferable that the main body 5 has a shape or form that is substantially boxed-shape or the like, although the shape or form thereof is not restricted thereto.

Figure 2A:
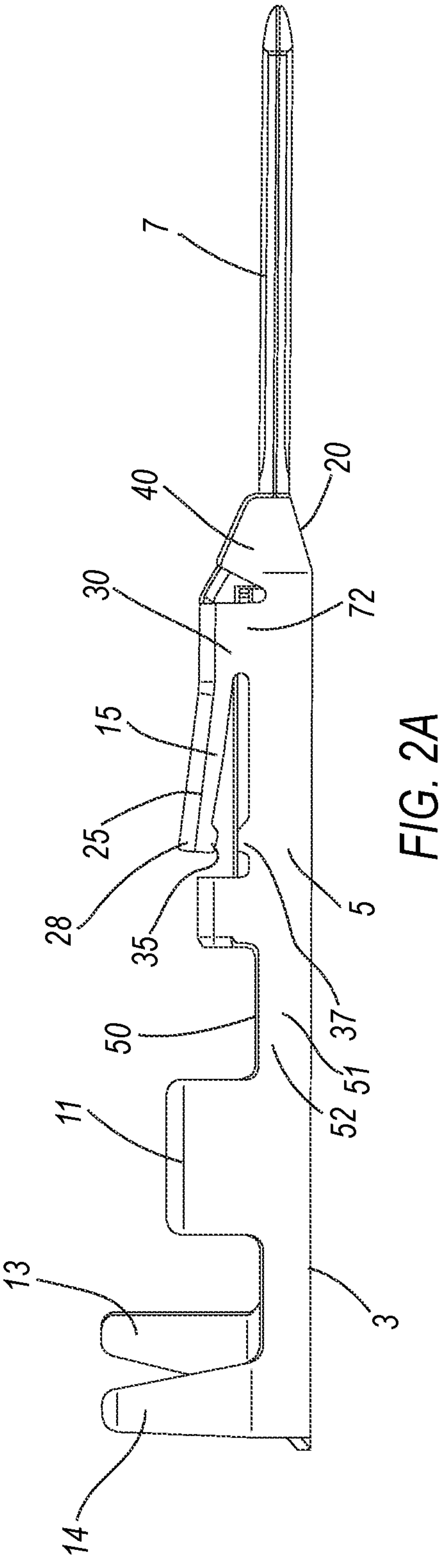
FIG. 2A is right side elevational view of the electrical male terminal of this invention.
Figure 2B:
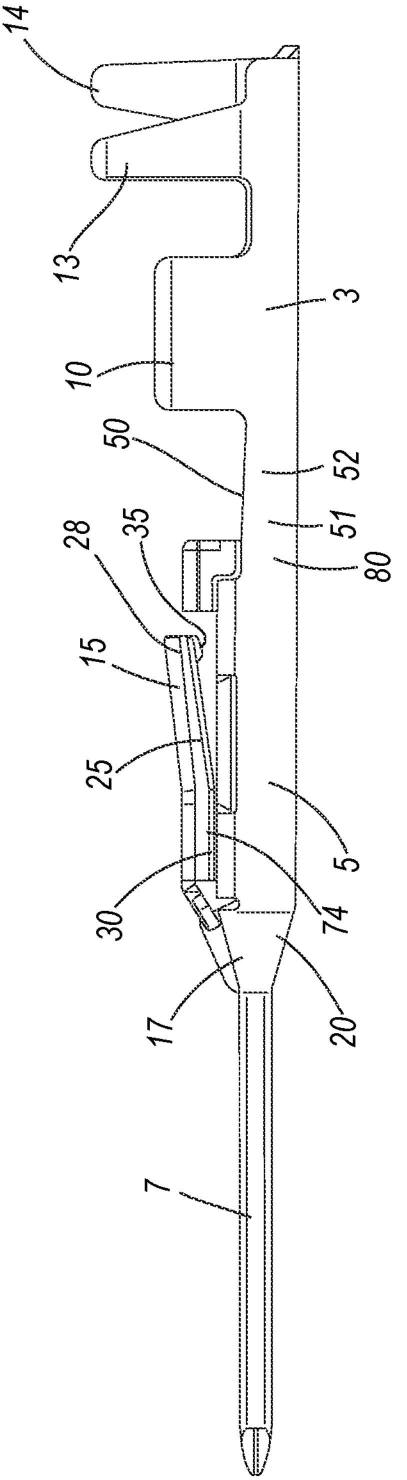
FIG. 2B is a left side elevational view of the electrical male terminal of this invention.

As illustrated in FIGS. 2A and 2B, the pair of wire-insulation clamping tabs or insulation crimp wing portions 13, 14 are not aligned when viewed at a side elevational view (that is, one of the pair, 13, 14 of wire-insulation clamping tabs or insulation crimp wings 13 is at a location that is closer to the wire-clamping tabs or core crimp wing portions 10, 11 compared to the location of one of the pair of wire-insulation clamping tabs or insulation crimp wing 14. As also illustrated in FIGS. 2A and 2B, the clamp or crimp area 3 integrally transitions to the main body 5 with a neck member 52, while the front end portion 20 of the main body 5 integrally transitions to the blade 7. As shown in FIG. 2A, the tang member 15 includes a lever member 25, the lever member 25 having an unattached end portion 28 and an attached end portion 30. As further seen in FIGS. 2A and 2B, the lever member 25, is shown here in a normal, relaxed state.

Figure 5A:
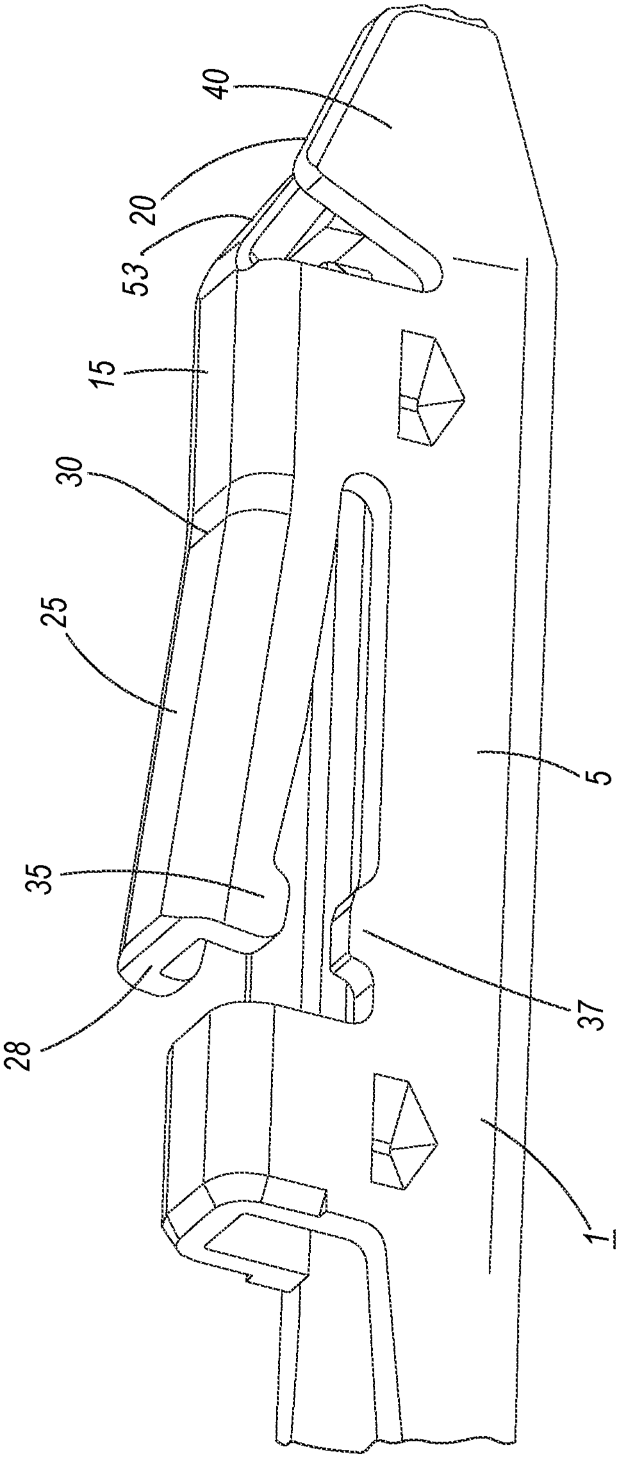
FIG. 5A shows the main body of the male terminal having the tang member, and further shows the guide and overstress protection structural arrangements or features of the male terminal.

The unattached end portion 28 of the lever member 25 preferably has, in a cross-section along a width thereof, a substantially U-shaped form or the like, although the form thereof is not restricted thereto (see, FIG. 5A). The attached end portion 30 of the lever member 25 preferably has, in a cross-section along a width thereof, a substantially L-shaped form or the like, although the form thereof is not restricted thereto.

Further, the lever member 25 has a protruding member 35, which meets another protruding member 37 that extends from the main body 5 (see, FIG. 2A). Both protruding members 35, 37 act as an overstress protection for the lever member 25. That is, the protruding members 35, 37 impinge against each other, when the lever member 25 is in a flexed state. This thereby prevents or protects the lever member 25 from becoming deformed when the male terminal 1 contacts or mates with a connector assembly 90 or the like. As such, the lever member 25 is operative to substantially move between a flexed state and a normal relaxed state without deformation. When seen at the side elevational views of FIGS. 2A and 2B, the protruding members 35, 37 are preferably substantially rectangular, round, trapezoid or the like, although the shape or form thereof is not restricted thereto.

In operation, when the electrical male terminal 1 enters the connector assembly 90, the unattached end portion 28 of the lever member 25 is freely pushed downward and moves from the normal, relaxed state, into a flexed state (that is, the protruding member 35 approaches the another protruding member 37). Upon full insertion of the electrical male terminal 1 into the connector assembly 90, the unattached end portion 28 of the lever member 25 freely moves upward, with the return to the normal, relaxed state of the lever member 25 (that is, the protruding member 35 moves away from the another protruding member 37) (see, FIG. 2A). The unattached end portion 28 is thereby impinged onto a housing protrusion 210 (see, FIG. 12) inside the connector assembly 90, locking and securing therein the electrical male terminal 1. Such a structural arrangement, which has the unattached end portion 28 of the lever member 25 impinged inside the connector assembly, acts as a locking and securing feature of the electrical male terminal 1.

Moreover, when the electrical male terminal 1 is fully inserted into the connector assembly 90, the clamp or crimp area 3 has a space or transition area 50, above neck member 52, (see, FIGS. 2A, 2B) and between the wire-clamping tabs or core crimp wing portions 10, 11 and the main body 5. The space or transition area 50 is available for accommodating therein a terminal position assurance (TPA) device (not shown) for assuring that the male terminal 1 remains locked, secured, and correctly positioned within the connector assembly 90.

Also shown in FIG. 2A is a panel shield member 40 at the front end portion 20 of the main body 5, the panel shield member 40 protruding from a portion of the front end portion 20 of the main body. Further shown in FIG. 2B is the tapered portion 17 of the front end portion 20 of the main body 5. Together, the panel shield member 40 and the tapered portion 17 (and a protruding guide member 53, illustrated in FIGS. 6A and 6B, discussed later) assist in guiding and positioning the blade 7 and the main body 5 when mating the electrical male terminal 1 with the connector assembly 90.

Figure 3A:
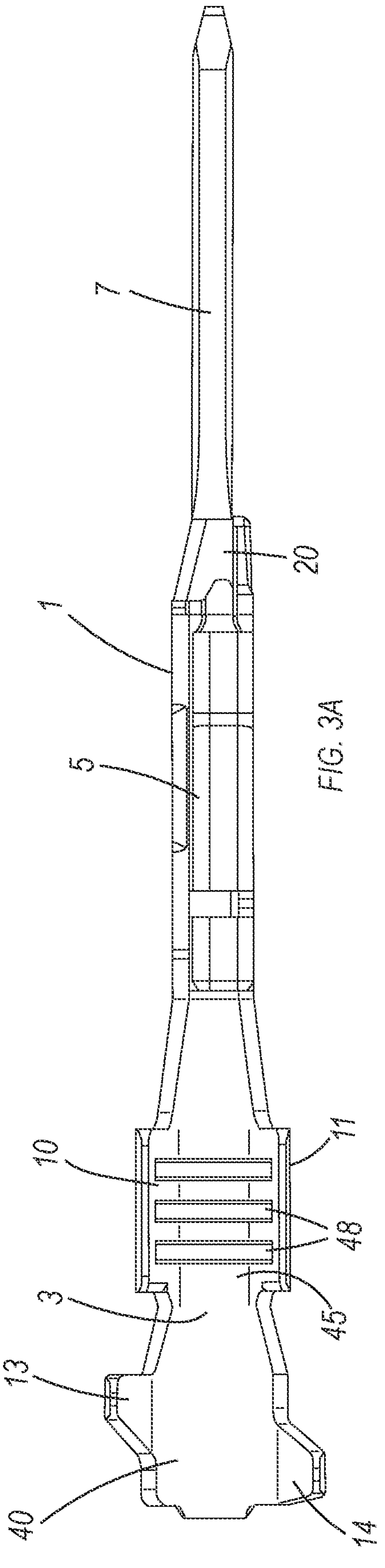
FIG. 3A is a top elevational view of the electrical male terminal of this invention.

The top elevational views of the clamp or crimp area 3, the main body 5, and the blade 7 are shown in FIG. 3A. As also shown in FIG. 3A, and previously discussed, the pair of wire-insulation clamping tabs or insulation crimp wing portions 13, 14 are unaligned, not directly aligned with, or substantially opposing each other. Further, as mentioned previously, the location of one of the pair of wire-insulation clamping tabs or insulation crimp wing portion 13 is nearer to the wire-clamping tabs or core crimp wing portions 10, 11 of the electrical male terminal 1 compared to the location of the other one of the pair of wire-insulation clamping tabs or insulation crimp wing portion 14. This is so as to maximize the surface area of the insulated portion 120 of the electrical wire or cable 100 onto which the pair of wire-insulation clamping tabs or insulation crimp wing portions 13, 14 connect and mount when clamped or crimped.

Also illustrated in FIG. 3A are the pair of wire-clamping pads or core crimp wing portions 10, 11, of clamp or crimp area 3. The pair of wire-clamping pads or core crimp wing portions 10, 11 are substantially aligned with or substantially opposing each other (see also, FIGS. 2A and 2B where the electrical male terminal 1 is viewed at an elevational side thereof) and are substantially symmetrical. Between the pair of wire-clamping tabs or core crimp wing portions 10, 11 is a floor member 45 having a plurality of notches 48. The shape of the floor member 45 may be substantially flat in shape (or substantially concave, rounded, as similar to that of the floor member 40), As shown in more detail, the floor 45 of the wire-clamping tabs or core crimp wing portions 10, 11 is substantially flat in shape (as illustrated in the cross-sectional view of FIG. 4C), although the floor 45 may alternatively be substantially concave, or rounded in shape (as similar to that of the floor member 40) (as illustrated in the cross-sectional view of FIG. 4D). Each of the plurality of notches 48 is substantially elongated in shape (as shown in FIGS. 2A, 2B, 4A, and 4B), but the shape of each of the notches 48 is not restricted thereto. A minimum of two notches 48 is possible, but at least three notches 48 are preferable. A minimum of one protruding member 60 is possible, but at least two protruding members 60 are preferable. The combination of the notches 48 and protruding members 60 creates a serration to the floor member 45 and pair of wire-clamping pads or core crimp wing portions 10, 11. This structural arrangement ensures a secure contact and grip between the floor member 45 and pair of wire-clamping pads or core crimp wing portions 10, 11 with a wire core portion of an electrical wire or cable (not shown).

Figure 4A:
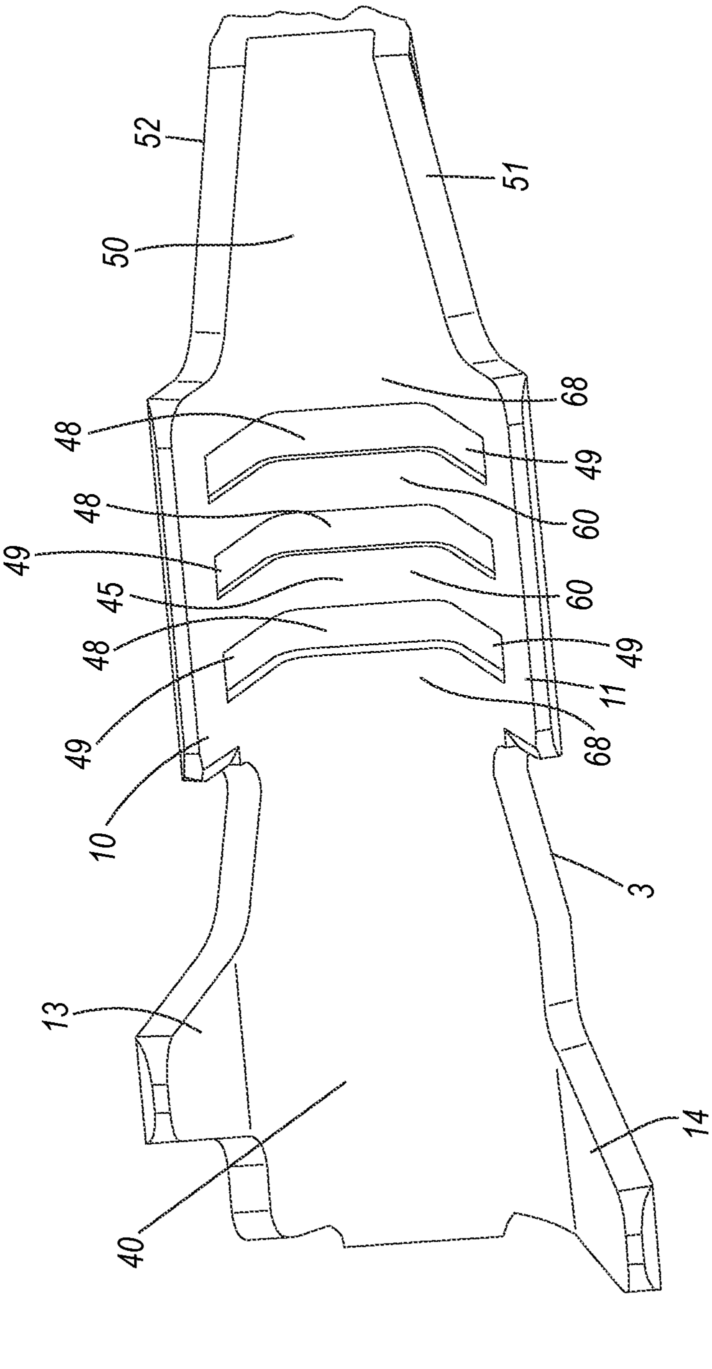
FIG. 4A shows a top elevational view of the clamp or crimp area having the pair of foldable wire-insulation clamping tabs or insulation crimp wing portions and the pair of wire-clamping tabs or core crimp wing portions, the latter having a plurality of substantially elongated notches that respectively extend substantially near the ends of the wire-clamping tabs or core crimp wing portions.

As further illustrated in FIG. 4A, each of the elongated notches 48 fully extend along the floor member 45 between the pair of wire-clamping tabs or core crimp wing portions 10, 11; and each of the elongated notches 48 further respectively partially extend, at end portions 49 thereof, into the pair of wire-clamping tabs or core crimp wing portions 10, 11 substantially near the ends thereof. Alternatively, an additional embodiment shown in FIG. 4B, has the end portions 49 of the elongated notches 48 respectively extending into the pair of wire-clamping tabs or core crimp wing portions 10, 11 and substantially exiting at and extending into the ends or tips thereof.

Figure 3B:
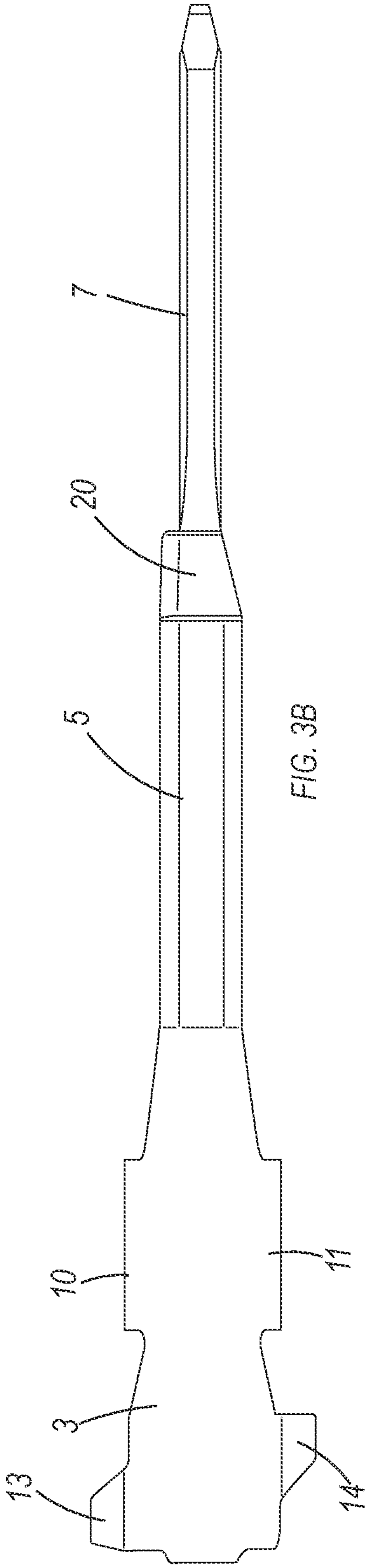
FIG. 3B is a bottom elevational view of the electrical male terminal of this invention.

Illustrated in FIG. 3B is the bottom elevational views of the clamp or crimp area 3, the main body 5, and the blade 7 of the electrical male terminal 1. The front end portion 20 of the main body 5 transitions the main body 5 to the blade 7 which is connected and integral thereto (FIG. 3B). Also shown in FIG. 3B are the pair of wire-clamping tabs or core crimp wing portions 10, 11, which are substantially symmetrical and respectively extend from the sides of the floor member 45 of the clamp or crimp area 3. The embodiment of electrical male terminal 1 shown in FIG. 313 displays the pair of wire-insulation clamping tabs or insulation crimp wing portions 13, 14, which are substantially unaligned, and is also evident when viewed at side elevational views thereof (see also, FIGS. 2A and 2B).

Figure 4B:
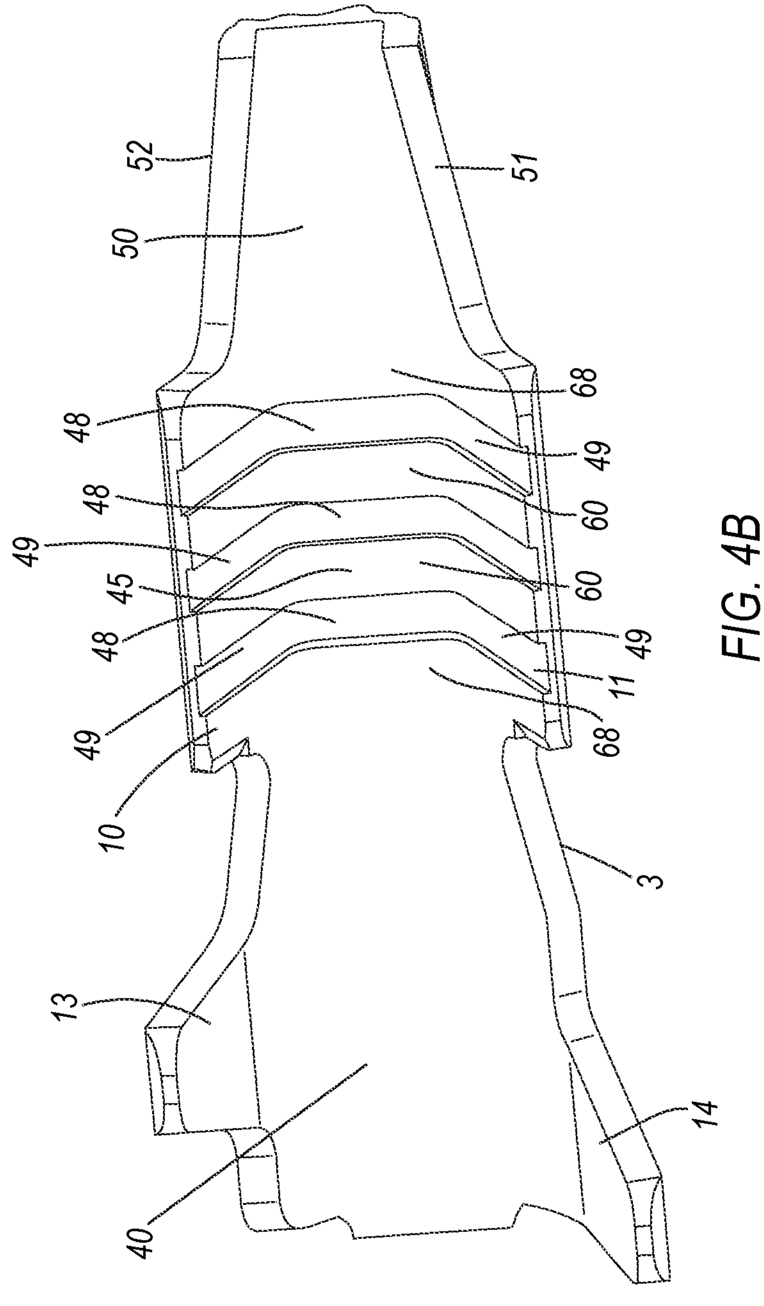
FIG. 4B shows a top elevational view of the clamp or crimp area having the pair of foldable wire-insulation clamping tabs or insulation crimp wing portions and the pair of wire-clamping tabs or core crimp wing portions, the latter having a plurality of substantially elongated notches that respectively extend to the ends of the wire-clamping tabs or core crimp wing portions.
Figure 4C:
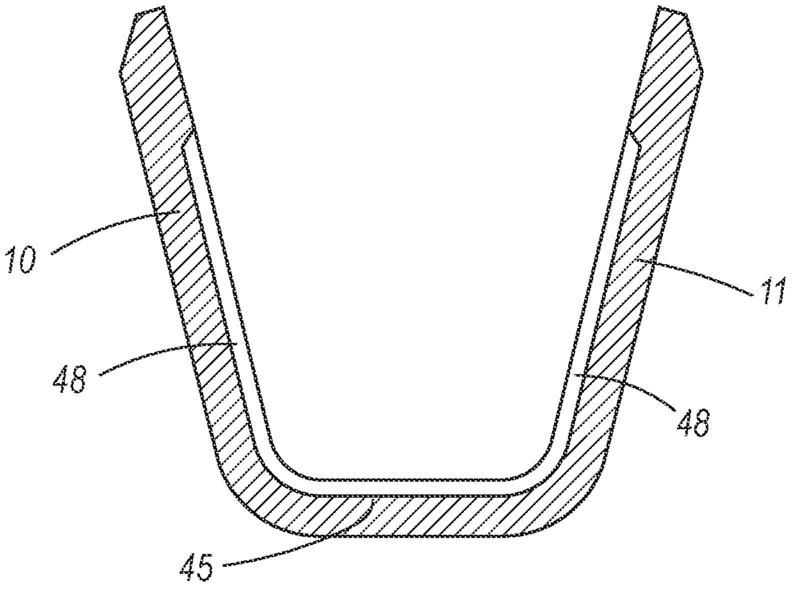
Figure 4D:
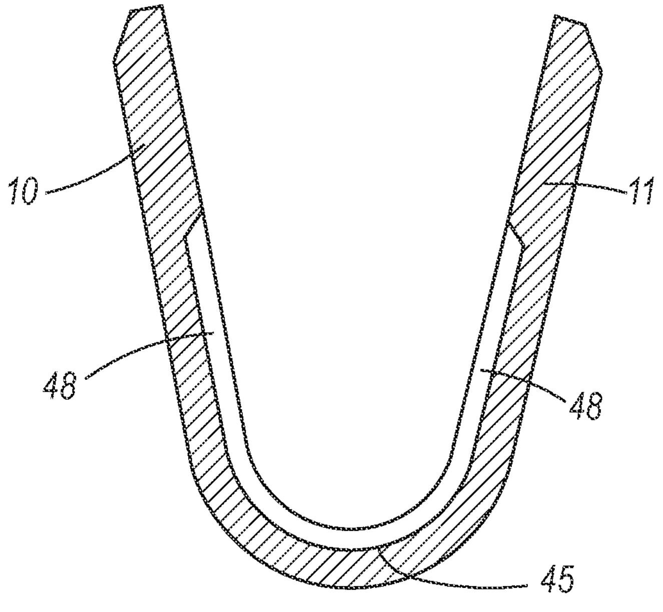
FIG. 4D shows a cross-sectional view of the floor of the wire-clamping tabs or core crimp wing portions as substantially concave, or rounded in shape.

Also illustrated in each of FIGS. 4A and 4B is a front portion 51 of the clamp or crimp area 3. The front portion 51 of the clamp or crimp area 3 includes a space or transition area 50 which is above a neck member 52 and between the main body 5 and the wire-clamping tabs or core crimp wing portions 10, 11. The neck member 52 has a narrowly tapered shape, narrowly tapering from the floor member 45, and the wire-clamping tabs or core crimp wing portions 10, 11, to where the neck member 52 meets the main body 5. Also, the narrowly tapered shape of the neck member 52 of the front portion 51 allows the wire core portion 110 of the electrical wire or cable 100 to remain seated or mounted within the floor member 45, and prevents the wire core portion of the electrical wire or cable (not shown) from being seated or mounted, in its entirety, onto the neck member 52. Preferably, the narrowly tapered form of the neck member 52 of the clamp or crimp area 3 allows only a front portion of the wire core portion of the electrical wire or cable (not shown) to protrude into the neck member 52. That is, the narrowly tapered form of the neck member 52 further prevents the wire core portion from entering substantially into the space or transition area 50. The transition area 50 as described earlier, becomes available for accommodating therein the IPA device (not shown) for assuring that the male terminal 1 remains locked, secured, and correctly positioned when inserted within the connector assembly 90. Thus, wherein only a front portion of the wire core portion enters or protrudes into the space or transition area 50, the wire core portion will not interfere with or inhibit accommodating therein, of the TPA device (not shown).

Illustrated in FIG. 5A is the tang member 15 and the attached end 30 and unattached end portion 28 of the lever member 25. As discussed earlier with respect to FIGS. 2A and 2B, FIG. 5A also shows the protruding member 35 of the unattached end portion 28 of the lever member 25, which is capable of impinging against another protruding member 37 that extends from the main body 5 in preventing the lever member 25 from being deformed when the main terminal 1 is mated with the connector assembly 90. The just-described structural arrangement protects the lever member 25 from being overstressed (and thereby prevented from being deformed) when the lever member 25 is flexed when entering the connector assembly 90. Also shown in FIG. 5A is the panel shield member 40 of the front end portion 20 of the main body 5. The panel shield member 40 is discussed in more detail in FIGS. 6A and 6B.

Figure 5B:
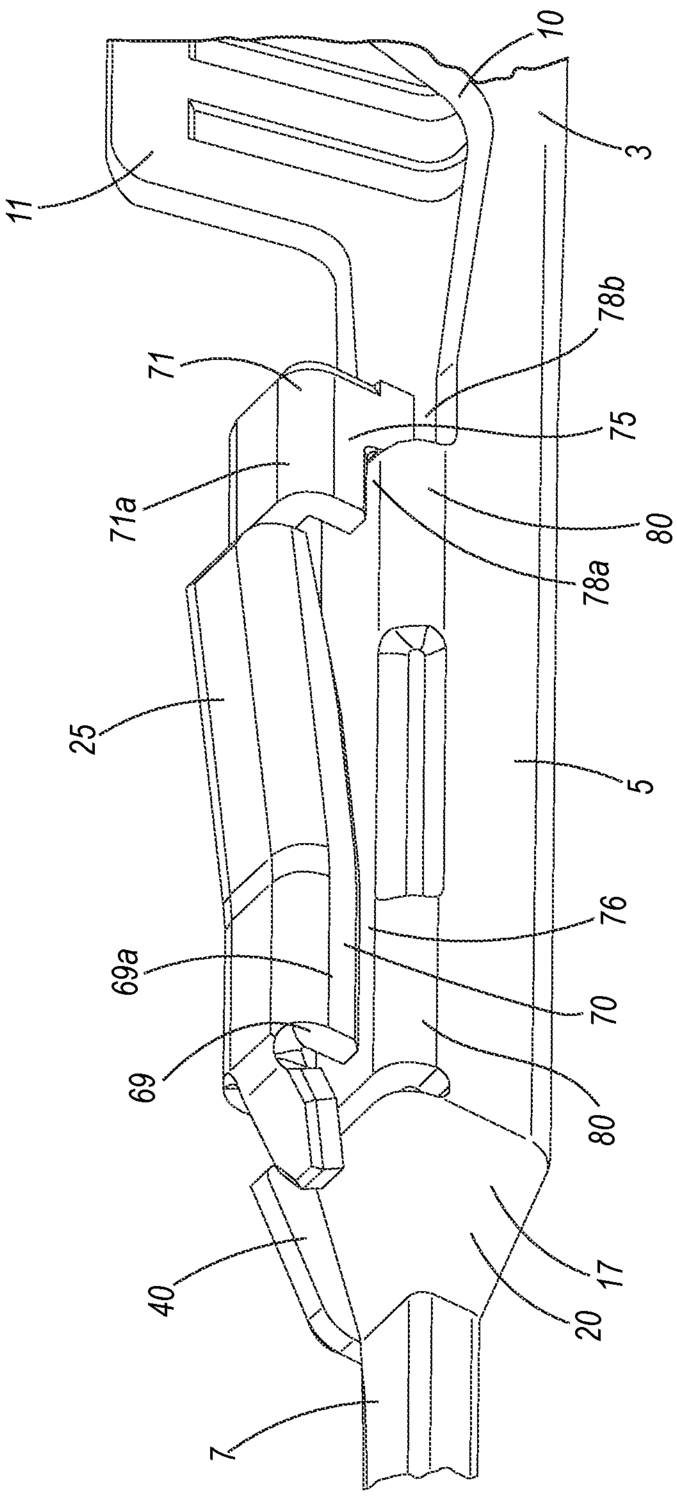
FIG. 5B shows a first support member and a second support member located at a front end portion and a back end portion, respectively, of the main body.

Illustrated in FIG. 5B are both the front and back portions 69, 71 of the main body 5 having a first support member 70 and a second support member 75, respectively. More particularly, an upper portion 69*a* at the front portion 69 of the main body 5 includes the first support member 70, while an upper portion 71*a* at the back portion 71 of the main body 5 includes the second support member 75. A gap 76 separates the first support member 70 from a lower portion 80 of the main body 5. A set of gaps 78*a*, 78*b* separate the second support member 75 from the lower portion 80 of the main body 5. When the electrical male terminal 1 enters the connector assembly 90, the first support member 70 and the second support member 75 are resiliently pushed downward toward the lower portion 80 of the main body 5 through the gaps 76, 78*a*/78*b*, respectively, located therebetween. With the above-described structural arrangements, the first and second support members 70, 75 provide the necessary resilience in preventing the electrical male terminal 1 of this invention from being overstressed and from being deformed when fitted into the connector assembly 90, thereby retaining polarity of the male terminal 1.

Figure 6A:
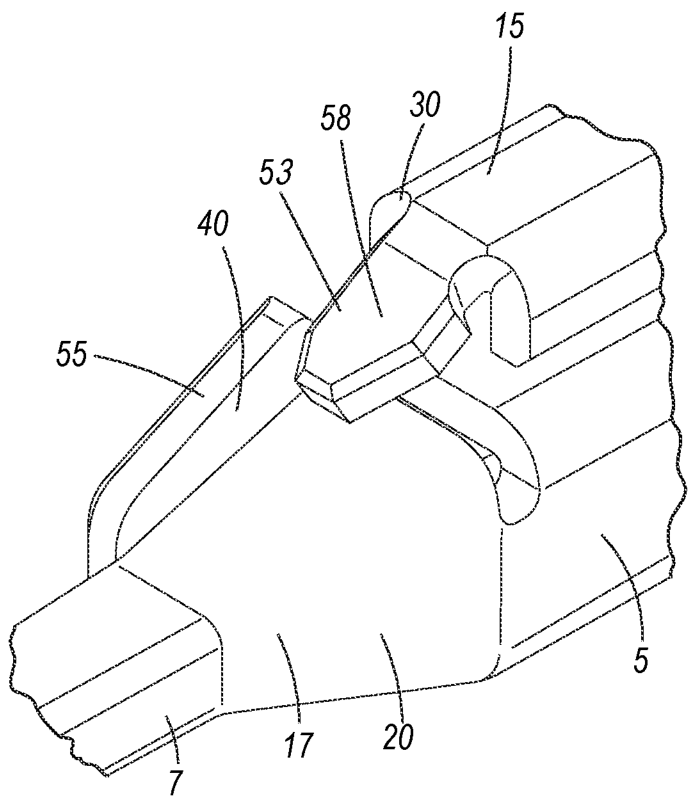
FIGS. 6A and 6B illustrate the tapered portion of the main body with a protruding guide member and a panel shield member for protecting the protruding guide member.
Figure 6B:
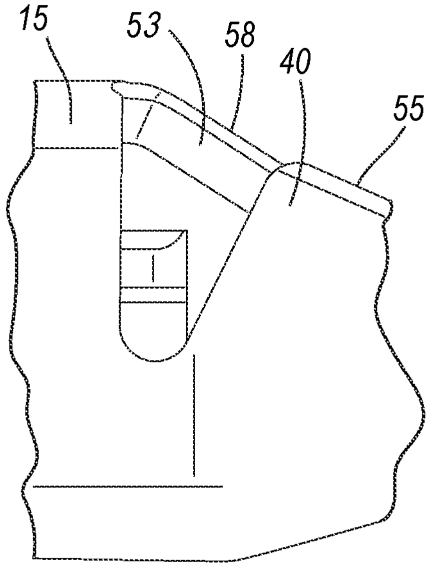

The panel shield member 40 is further illustrated in FIGS. 6A and 6B. The panel shield member 40 is illustrated herein as extending from a side portion of the front end portion 20 of the main body 5, although not limited thereto. The panel shield member 40 has an upper surface 55 and shown here at an incline, wherein the lower end of the upper surface 55 is toward the blade 7 and the upper end of upper surface 55 is toward the tang member 15.

Also shown in FIGS. 6A and 6B is a protruding guide member 53 that extends from and is attached to the tang member 15 of the main body 5. The panel shield member 40 protects the deformation of the protruding guide member 53 during, transport of the electrical male terminal 1 or preferably, when the electrical male terminal 1 is mated with and inserted into the connector assembly 90. As more particularly illustrated in FIG. 6B, it is preferred that an upper surface 55 extending, in its entirety, along the panel shield member 40 is substantially higher or equal in height to an upper surface 58 of the protruding guide member 53 (see, FIG. 6B). That is, it is preferable that the upper surface 55 of the panel guide member 40 is, in its entirety, higher than or equal to in height in comparison to the upper surface 58 of the protruding guide member 53. Likewise, the upper surface 58 of a portion of the protruding guide member 53 along the panel shield member 40, is lower than or equal to the upper surface 55 of the panel guide member 40, wherein the protruding guide member 53 substantially tapers from its attachment point with the tang member 15 substantially downward and toward the front end portion 20.

Figure 7:
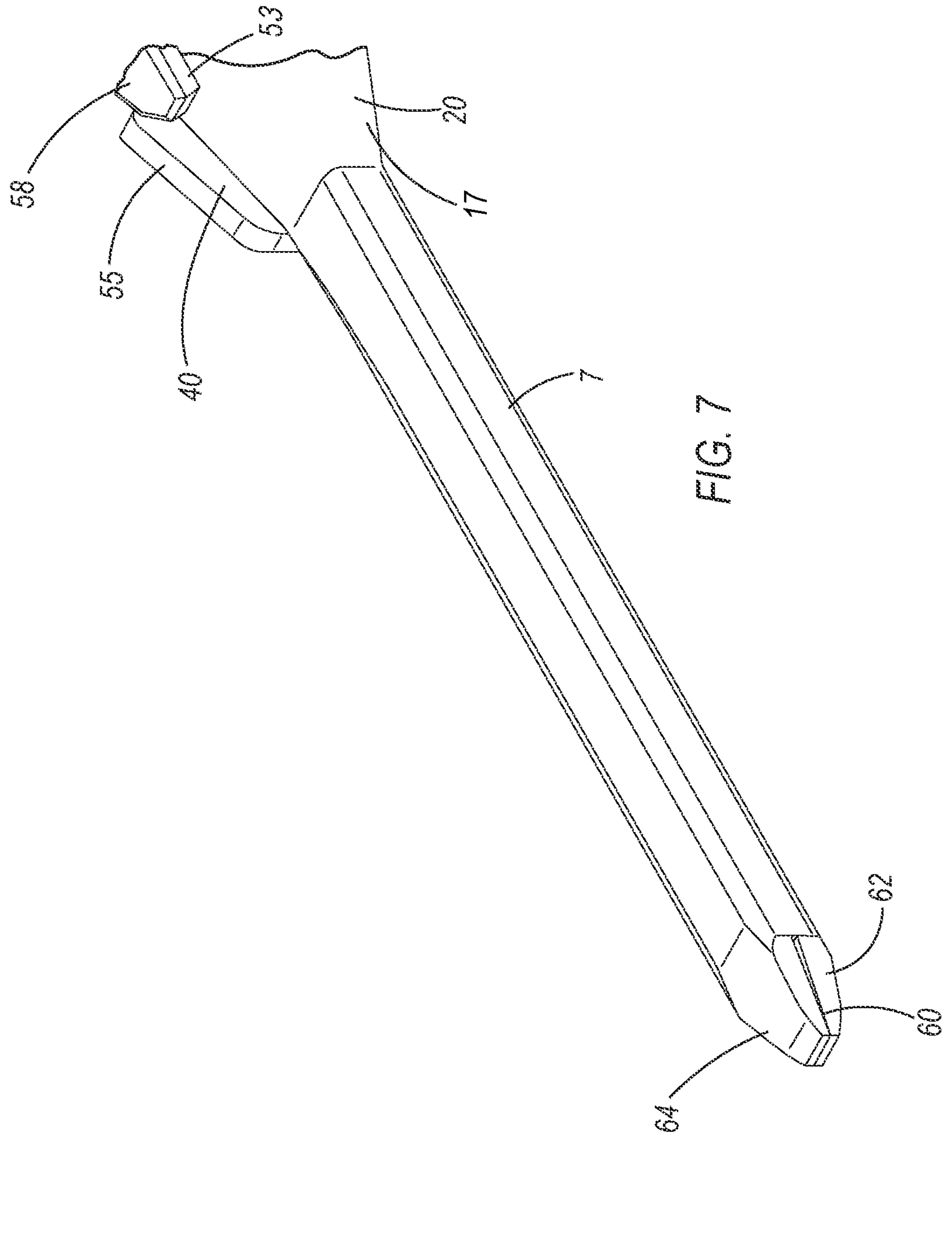
FIG. 7 shows the male blade extending from the tapered front end portion of the main body.

The front end portion 20 of the main body 5, as illustrated in FIG. 6A, transitions into the blade 7. The blade 7, as also shown in FIG. 7, acts as a male contact for the electrical male terminal 1 within the male connector assembly 90, and may be substantially rectangular, square, or the like in cross-sectional shape, although not limited thereto. At the end portion of the blade 7 is a tapered tip 60, which may include a lower portion 62 that is substantially symmetrical to an upper portion 64, but the lower portion 62 and upper portion 64 of the blade are not limited thereto so long as the tip 60 of the blade 7 is in a narrowly tapered form. The tapered tip 60 narrowly tapers toward the end of the blade 7, respectively, at the end of the electrical male terminal 1, and additionally acts to prevent stubbing or deformation of the blade 7.

Figure 8:
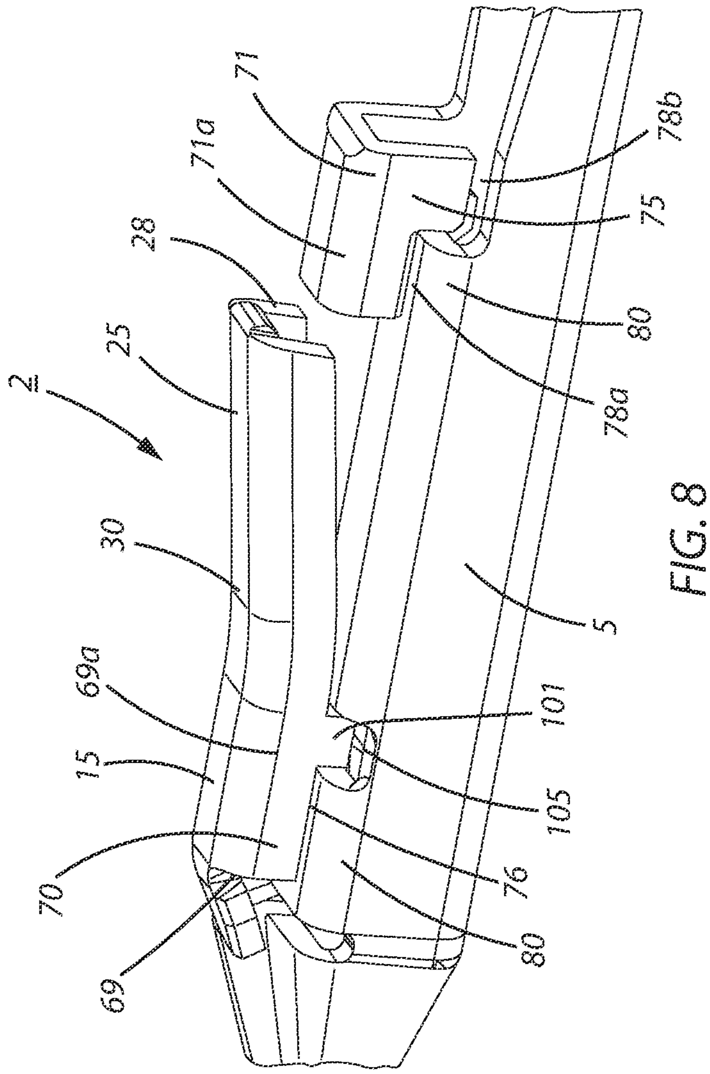
FIG. 8 is a rear side perspective view of another embodiment of the male terminal of this invention having yet another downward extending protruding member extending from a first support member of an upper portion at a front portion of the main body towards a cut-out portion at a lower portion of the main body, the cut-out portion accommodating therein the yet another downward extending protruding member.

Another embodiment of the electrical male terminal, generally referred to as reference number 2, of this invention, is shown in FIG. 8. Here, all the elements or parts of the above-described electrical male terminal 1 are also comprised in the electrical male terminal 2, except where indicated or as described, and are similarly labeled with similar reference numbers. Also shown in the embodiment of the electrical male terminal 2 are the tang member 15, and the unattached end portion 28 and attached end portion 30 of the lever member 25.

Further illustrated in FIG. 8 are both the front and back portions 69, 71 of the main body 5 having the first support member 70 and the second support member 75, respectively. More particularly, the upper portion 69*a* at the front portion 69 of the main body 5 includes the first support member 70, while an upper portion 71*a* at the back portion 71 of the main body 5 includes the second support member 75. The gap 76 separates the first support member 70 from the lower portion 80 of the main body 5. The set of gaps 78*a*, 78*b* separate the second support member 75 from the lower portion 80 of the main body 5. When the electrical male terminal 2 enters the connector assembly 90, the first support member 70 and the second support member 75 are resiliently pushed downward toward the lower portion 80 of the main body 5 through the gaps 76, 78*a*/78*b*, respectively, located therebetween. With the above-described structural arrangements, the first and second support members 70, 75 provide the necessary resilience in preventing the electrical male terminal 2 of this invention from being overstressed and from being deformed when fitted into the connector assembly 90, thereby retaining polarity of the male terminal 2.

Furthermore, in order to protect the electrical male terminal 2 when in use, and more particularly, to support and prevent the tang member 15 from inadvertently or accidentally rotating relative to the lower portion 80 of the main body 5, which can cause the electrical male terminal 2 from unraveling (that is, the tang member 15 or the lever member 25 separating from or rotating relative to the lower portion 80 of the main body 5), a yet another protruding member 101 extends from the first support member 70. The lower portion 80 of the main body 5 is provided with a cut-out portion 105 for accommodating therein the yet another protruding member 101.

Figure 9:
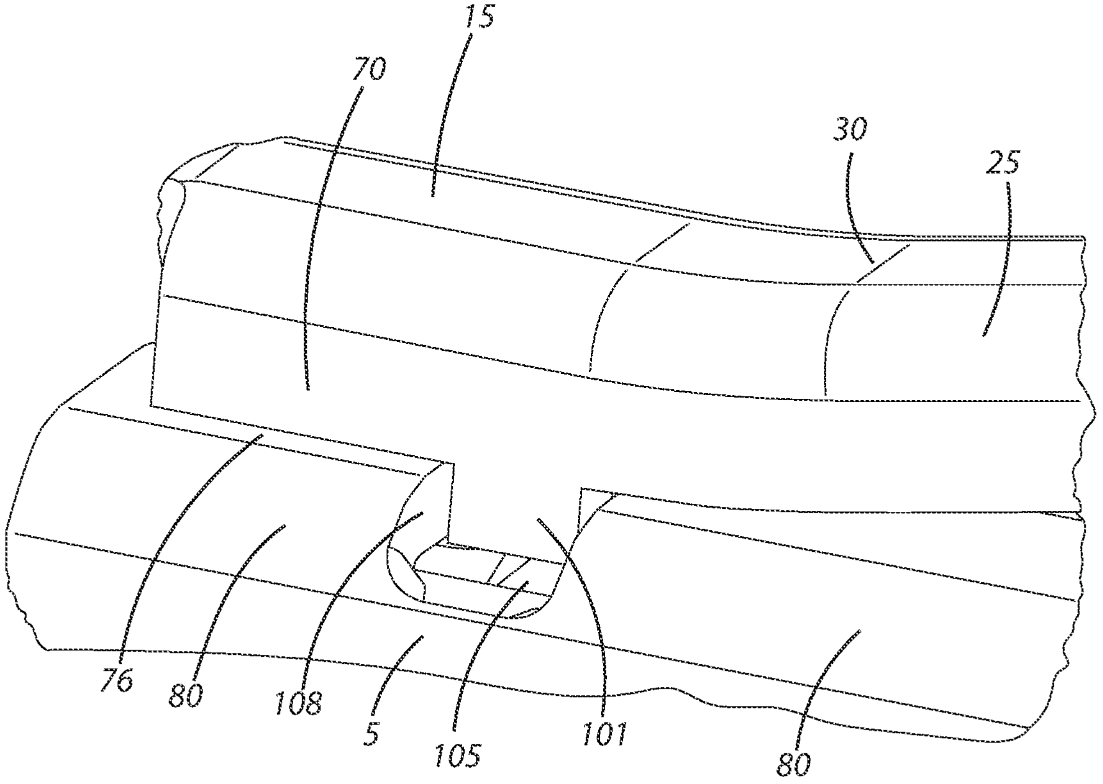
FIG. 9 illustrates in more detail the cut-out portion of the lower portion of the main body accommodating therein the yet another downward protruding member so as to prevent the lever member from moving sideways or rotating.

As further illustrated in FIG. 9, the cut-out portion 105 of the lower portion 80 of the main body 5, which accommodates therein the yet another protruding member 101, includes side portions 108, which allow the yet another protruding member 101 to impinge or abut against the side portion 108 of the cut-out portion 105, thereby preventing the tang member 15 or the lever member 25 from separating from or rotating relative to the lower portion 80 of the main body 5. Thus, with the yet another protruding member 101 being accommodated within the cut-out portion 105, as described above, not only does the electrical male terminal 2 of this invention protect the lever member 25 from being overstressed (and thereby prevented from being deformed) by the protruding member 35 of the unattached end portion 28 of the lever member 25 impinging against another protruding member 35 that extends from the main body 5 (see, e.g., MG, 5A), the electrical male terminal 2 of this invention is further prevented from unraveling by the side portion 108 of the cut-out portion 105 against which the yet another protruding member 101 impinges or abuts to prevent the tang member 15 or the lever member 25 from separating or rotating relative to the lower portion 80 of the main body 5.

As illustrated in FIGS. 8 and 9, although it is shown that the yet another protruding member 101 is located and extends from the first support member 70 of the front portion 69 of the main body 5, which is in a more forward location compared to the location of the attached end 30 of the tang member 15, such a location of the yet another protruding member 101 is not limited thereto.

Figure 10:
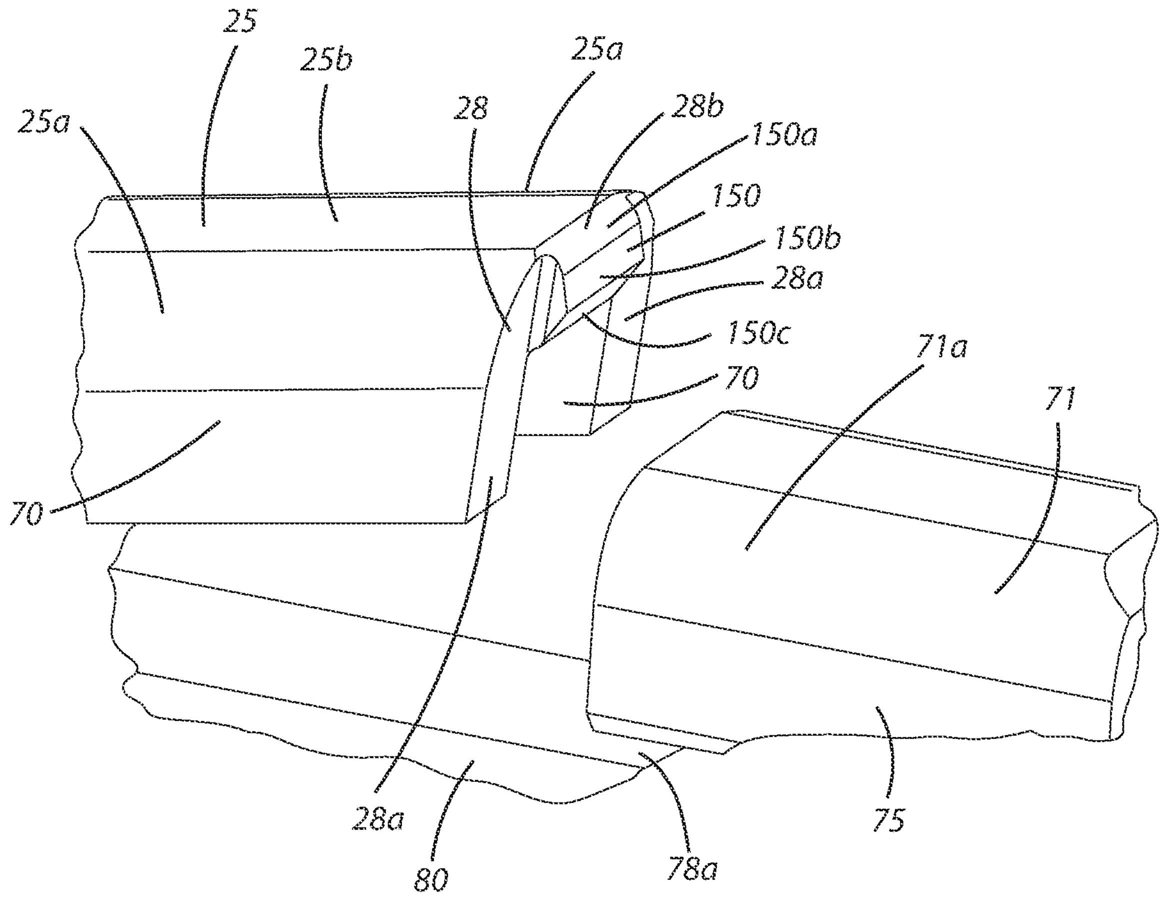
FIG. 10 shows a protrusion extending from an unattached end portion of the lever member, the protrusion having faces angled relative to each other.

The electrical male terminal 2 of this invention further includes a protrusion 150 extending from the unattached end portion 28 of the lever member 25, as shown in FIG. 10. The unattached end portion 28 of the lever member 25 preferably has side end portions 28*a* and a center end portion 28*b*. As illustrated in FIG. 10, the protrusion 150 preferable extends from the center end portion 28*b*, although such a structural arrangement is not limited thereto. That is, the protrusion 150 is not limited to extending from the center end portion 28*b* of the end portion 28 of the lever member 25, and may also extend from the side end portions 28*a* of the end portion 28 of the lever member 25. Although not limited thereto, the protrusion 150 includes faces 150*a*, 150*b*, 150*c*, which are angled relative to each other, as shown in FIG. 10. The relative angles among the faces 150*a*, 150*b*, 150*c* of the protrusion 150 may vary depending on the ability of the protrusion 150 in efficiently deflecting the lever member 25 upwards when the protrusion 150 interacts with an internal protrusion of a housing 200 or a connector assembly 90, as further discussed later with respect to FIG. 12. Thus, the protrusion 150 makes the electrical male terminal 2 of this invention more difficult, to remove from the housing 200 or the connector assembly 90, and the electrical male terminal 2 is thus protected against the electrical male terminal 2 from falling out during use.

It is noted that the remaining parts shown in FIG. 10 are similar to the parts previously described for the electrical male terminal 1 (and the other embodiment of the electrical male terminal 2 in FIGS. 8 and 9) and have the same reference numbers, and thus, descriptions thereof are not repeated here.

Figure 11:
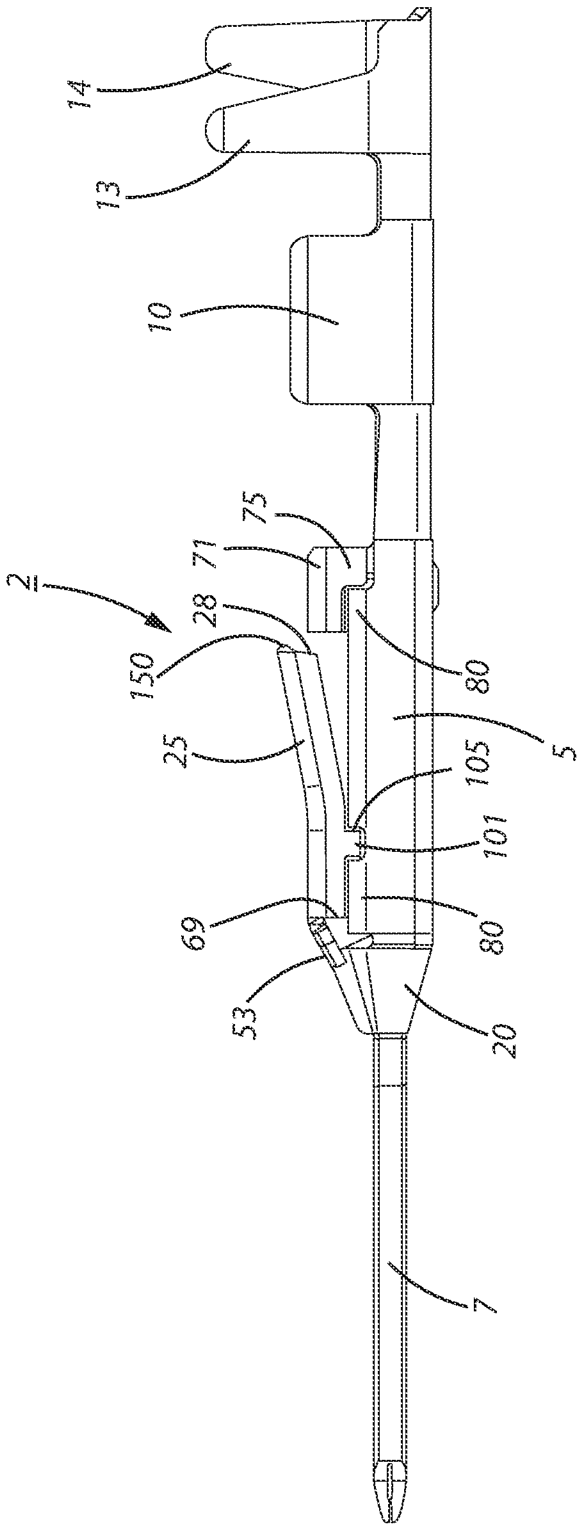
FIG. 11 is a left side elevational view of the another embodiment of the electrical male terminal of this invention, which includes the yet another protruding member extending from the first support member of the front portion of the main body, the cut-out portion of the lower portion of the main body, which accommodates therein the yet another protruding member, and the protrusion extending from the unattached end portion of the lever member.
Figure 12:
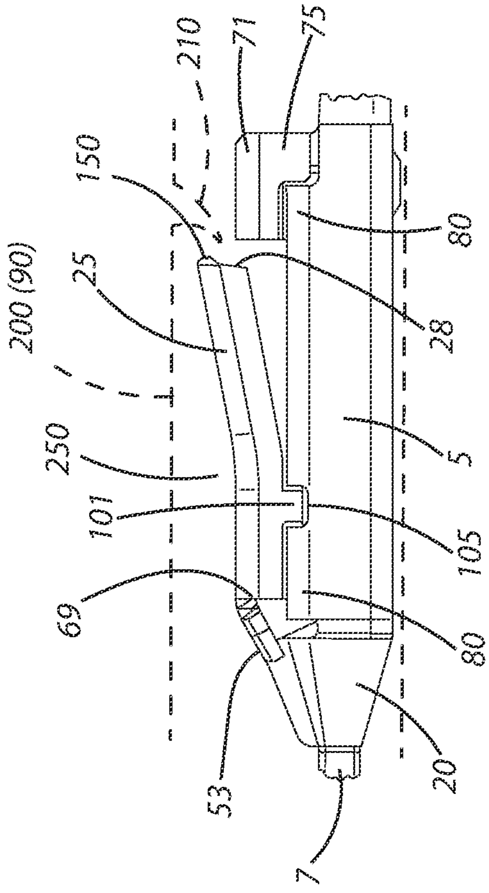
FIG. 12 illustrates the protrusion extending from the unattached end portion of the lever member for promoting the lever member to deflect upward when interacting with the internal protrusion of the housing or connector assembly, which makes it more difficult for the electrical male terminal of this invention to be removed from the housing or connector assembly, and protects the electrical male terminal of this invention from inadvertently failing out during use.

FIG. 11 is a left side elevational view of the electrical male terminal 2 of this invention, which is comparable to the left side elevation view of the electrical male terminal 1, except that the embodiment of the electrical male terminal 2 includes the yet another protruding member 101 extending from the first support member 70 of the front portion 69 of the main body 5, and the cut-out portion 105 of the lower portion 80 of the main body 5, which accommodates therein the yet another protruding member 101, as described above in detail with respect to FIGS. 8 and 9, further included in the electrical male terminal 2 of this invention, as illustrated in the side elevational view thereof in FIG. 11, is the protrusion 150 extending from the unattached end portion 28 of the lever member 25, as described in more detail with respect to FIGS. 10 and 12.

Illustrated in FIG. 12 is the housing protrusion 210 internally extending from the housing 200 (or the connector assembly 90), which blocks the end portion 28 of the lever member 25, and consequently, blocks the electrical male terminal 2 from falling out when in use. More particularly, the protrusion 150, which extends from the unattached end portion 28 of the lever member 25, allows the protrusion 150 to efficiently deflect the lever member 25 upwards when the protrusion 150 interacts with the internal protrusion 210 of the housing 200 or the connector assembly 90. Thus, the protrusion 150 makes the electrical male terminal 2 of this invention more difficult to remove from the housing 200 or the connector assembly 90, and the electrical male terminal 2 is thus protected against the electrical male terminal 2 from falling out during use.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

We claim:

1. An electrical male terminal for insertion into a connector assembly, said electrical male terminal, comprising:
- a clamp or crimp area;
- a main body attached to said clamp or crimp area, said main body having a tang member and a tapered portion; and
- a blade extending from said main body,
- wherein a support member of said main body includes a protruding member extending towards a lower portion of said main body,
- wherein said lower portion of said main body includes a cut-out portion for accommodating therein said protruding member,
- wherein said tang member is comprised of a lever member, said lever member having an unattached end portion and an attached end portion,
- wherein a center end portion that defines a thickness of said unattached end portion of said lever includes a protrusion extending therefrom, and
- wherein said protrusion extends substantially from said unattached end portion of said lever.

2. The electrical male terminal according to claim 1, wherein said protrusion extending from said center end portion that defines said thickness of said unattached end portion of said lever includes a plurality of faces.

3. The electrical male terminal according to claim 2, wherein at least one of said plurality of said faces of said protrusion ensures an interaction with a protrusion of a housing or connector assembly.

4. The electrical male terminal according to claim 2, wherein at least one of said plurality of said faces of said protrusion ensures the interaction with an internal protrusion of a housing or a connector assembly by having said lever member deflect upward thereby making it difficult to remove said electrical male terminal from said housing or said connector assembly.

* * * * *